(12) United States Patent
Samulak

(10) Patent No.: US 12,141,365 B1
(45) Date of Patent: Nov. 12, 2024

(54) GESTURE TRACKING DEVICE AND SYSTEM

(71) Applicant: Adam Samulak, Middle Village, NY (US)

(72) Inventor: Adam Samulak, Middle Village, NY (US)

( * ) Notice: Subject to any disclaimer, the term of this patent is extended or adjusted under 35 U.S.C. 154(b) by 0 days.

(21) Appl. No.: 18/103,537

(22) Filed: Jan. 31, 2023

(51) Int. Cl.
| | |
|---|---|
| *G06F 3/01* | (2006.01) |
| *G06F 3/03* | (2006.01) |
| *A63F 13/212* | (2014.01) |

(52) U.S. Cl.
CPC .............. *G06F 3/017* (2013.01); *G06F 3/014* (2013.01); *G06F 3/03* (2013.01); *A63F 13/212* (2014.09)

(58) Field of Classification Search
CPC .......... G06F 3/014; G06F 3/016; G06F 3/017; G06F 3/03; G06F 3/033; G06F 3/0338; G06F 3/0362; G06F 3/038; G06F 2203/013; G06F 2203/0331; G06F 2203/0335; G06F 2203/0384; A63F 13/20; A63F 13/21; A63F 13/212
See application file for complete search history.

(56) References Cited

U.S. PATENT DOCUMENTS

| | | | |
|---|---|---|---|
| 4,986,280 A | 1/1991 | Marcus et al. | |
| 6,126,373 A | 10/2000 | Yee et al. | |
| 6,304,840 B1 | 10/2001 | Vance et al. | |
| 7,390,157 B2 | 6/2008 | Kramer | |
| 8,868,373 B2 | 10/2014 | Eng et al. | |
| 9,104,271 B1 | 8/2015 | Adams et al. | |
| 9,342,151 B2 | 5/2016 | Gu | |
| 9,389,684 B2 | 7/2016 | Sebastian | |
| 10,019,059 B2 | 7/2018 | Messingher et al. | |
| 10,137,362 B2 | 11/2018 | Buchanan, IV et al. | |
| 10,281,982 B2 | 5/2019 | Keller et al. | |
| 10,324,530 B2 | 6/2019 | Keller et al. | |
| 10,791,963 B2 | 10/2020 | Bae et al. | |
| 11,231,781 B2 | 1/2022 | Xiong et al. | |

(Continued)

OTHER PUBLICATIONS

Will Cogley; 3D Printed Biomimetic Mechatronic Hand: Control Glove Explained; YouTube Video; https://www.youtube.com/watch?v=8HQ-CtgXudY.

(Continued)

*Primary Examiner* — Nathan Danielsen
(74) *Attorney, Agent, or Firm* — Goldstein Law Offices, P.C.

(57) ABSTRACT

A gesture tracking system for detecting and measuring phalangeal joint movement of a finger. The system includes an attachment structure configured to couple to a finger and a sensor assembly coupled to the attachment structure. The sensor assembly includes more than one sensor. Each sensor is associated with exactly one phalangeal joint and includes a string potentiometer, a recoil spring, and an anchor point. The string potentiometer includes a string and a drum. The string has a first end, a second end, and a length therebetween. The first end of the string is disposed on the drum and the recoil spring is coupled to the drum. The second end of the string is coupled to the anchor point, which is disposed distal to the first end of the string. The length of the string indicates a linear position of the associated phalangeal joint.

17 Claims, 15 Drawing Sheets

(56) References Cited

U.S. PATENT DOCUMENTS

| | | |
|---|---|---|
| 2006/0230902 A1* | 10/2006 | Oberheim ............ B23D 45/046 83/477.1 |
| 2010/0134327 A1 | 6/2010 | Dihn et al. |
| 2010/0234182 A1 | 9/2010 | Hoffman et al. |
| 2012/0157263 A1 | 6/2012 | Sivak et al. |
| 2015/0358543 A1 | 12/2015 | Kord |
| 2016/0018892 A1* | 1/2016 | Gu .......................... G06F 3/014 345/156 |
| 2016/0213978 A1* | 7/2016 | Ban ......................... G06F 3/014 |
| 2017/0165567 A1* | 6/2017 | Walters .................. G06F 3/014 |
| 2019/0373096 A1* | 12/2019 | Shim ..................... G06F 1/1626 |
| 2020/0375287 A1 | 12/2020 | Ben-Tzvi et al. |
| 2021/0020003 A1 | 1/2021 | Yonehara et al. |
| 2021/0373668 A1 | 12/2021 | Chumnong et al. |

OTHER PUBLICATIONS

Lucas Vrtech; I made $22 Virtual Reality Gloves; YouTube Video; https://www.youtube.com/watch?v=nmP8iGaPbeI.

Lucas Vrtech; I built $60 VR Haptic Gloves to feel Virtual Reality; YouTube Video: https://www.youtube.com/watch?v=ZTzn37Usa-U.

\* cited by examiner

GESTURE TRACKING DEVICE AND SYSTEM

TECHNICAL FIELD

The present disclosure relates generally to a gesture recognition and tracking system. More particularly, the present disclosure relates to a gesture tracking system for detecting and measuring phalangeal joint movements.

BACKGROUND

Video gaming technology continues to evolve such that the line between fantasy and reality becomes increasingly blurred. Gesture recognition technology plays a major role in this evolution. This technology aims to create an intuitive, immersive gaming interface that allows a user to control computer movements in the game by simply moving their body.

To this end, wearable control devices have been developed to track user movements. Such devices leverage motion data and convert it into in-game actions to add a new dimension of immersiveness and interactivity to gaming. Simple hand gestures, for example, can be mapped to complex moves in the game. Wearable control devices may also be implemented to make virtual and augmented reality-type gaming even more realistic.

Despite these advances, however, known wearable control devices are often bulky and awkward to use. Further, known devices tend to be imprecise in accomplishing on-screen movements since they measure the movement of the entire finger, rather than measuring individual phalangeal joints. In some cases, such devices are so cumbersome that they interfere with the very computer-implemented actions they are meant to facilitate. Such devices also tend to be prohibitively expensive for the average consumer.

Accordingly, what is needed is a lightweight, compact gesture tracking device and system that is inexpensive to manufacture and easy to operate. Also what is needed is a gesture tracking device that provides high-integrity tracking of fine motor movements. Finally what is needed is a gesture tracking device that leverages motion data to transform physical movements into computer actions with a high degree of fidelity.

In the present disclosure, where a document, act or item of knowledge is referred to or discussed, this reference or discussion is not an admission that the document, act or item of knowledge or any combination thereof was at the priority date, publicly available, known to the public, part of common general knowledge or otherwise constitutes prior art under the applicable statutory provisions; or is known to be relevant to an attempt to solve any problem with which the present disclosure is concerned.

While certain aspects of conventional technologies have been discussed to facilitate the present disclosure, no technical aspects are disclaimed and it is contemplated that the claims may encompass one or more of the conventional technical aspects discussed herein.

BRIEF SUMMARY

An aspect of an example embodiment in the present disclosure is to provide a gesture tracking system for detecting and measuring phalangeal joint movement of a finger. The finger includes a first phalangeal joint and a second phalangeal joint. Accordingly, the present disclosure describes an attachment structure and a sensor assembly. The attachment structure is configured to couple to at least one finger.

The sensor assembly is coupled to the attachment structure and configured to detect movement of a finger. The sensor assembly includes multiple sensors, where each sensor is associated with exactly one phalangeal joint.

Each of the sensors includes a rotational sensor, a recoil spring, and one or more anchor points. In a preferred embodiment, the rotational sensor is implemented using a string potentiometer. In some embodiments, each of the sensors includes a housing to enclose the string potentiometer and the recoil spring. The string potentiometer includes a string and a drum. The string has a first end, a second end, and a length therebetween. The first end of the string is disposed on the drum and the recoil spring is coupled to the drum. The second end of the string is coupled to an anchor point disposed distal to the first end of the string. The length of the string indicates a linear position of the associated phalangeal joint.

In some embodiments, the first sensor includes a lateral position detection element. A portion of the length of the string extends through the lateral position detection element. In certain embodiments, the lateral position detection element includes a potentiometer to detect and measure lateral movement of the associated phalangeal joint.

In some embodiments, the attachment structure includes a flexible pad and a finger strap coupled to each sensor.

In some embodiments, the sensors include a first sensor configured to detect movement of the first phalangeal joint and a second sensor configured to detect movement of the second phalangeal joint. In certain embodiments, the sensors further include a third sensor which is configured to detect movement of the third phalangeal joint. In one embodiment, the anchor point of the first sensor is attached to a housing of the second sensor. In embodiments where the third sensor is employed, the anchor point of the second sensor is attached to a housing of the third sensor. In another embodiment, the anchor point is attached to the attachment structure. In some embodiments, a fingertip cap is disposed distal to the second sensor or the third sensor, and the anchor point of the sensor which is furthest from the first sensor is attached to the fingertip cap.

In some embodiments, the anchor point includes a tensioner element coupled to the attachment structure. In other embodiments, the tensioner element is coupled to the housing.

Some embodiments of the gesture tracking system include a microcontroller coupled to the sensor assembly. The microcontroller is configured to receive separate electrical signals from each of the sensors.

An aspect of another example embodiment in the present disclosure includes a gesture tracking device for detecting and measuring phalangeal joint movement. The gesture tracking device includes a plurality of sensors, an attachment structure coupled to each of the sensors, a finger assembly, and a thumb assembly. Each sensor includes a housing, a string potentiometer disposed within the housing, and a recoil spring. The string potentiometer includes a string disposed on a drum. In some embodiments, the recoil spring is attached to the drum. The string includes a first end, a second end, and a length therebetween.

Some embodiments of a finger assembly include one or more sensors, where each sensor is disposed proximal to a metacarpophalangeal joint or an interphalangeal joint of a finger. A flexible pad is disposed between the sensor and the finger.

Some embodiments of a thumb assembly include one or more sensors, where each sensor is disposed proximal to a carpometacarpal joint or an interphalangeal joint of a thumb. A flexible pad is disposed between the sensor and the thumb.

In some embodiments, each of the sensors includes at least one anchor point. The anchor point is disposed distal to the first end of the string and is coupled to the second end of the string. The length of the string indicates a linear position of the associated phalangeal joint. A change in the length of the string indicates linear movement of the associated phalangeal joint.

In some embodiments, a lateral position detection element is coupled to each of the sensors. The lateral position detection element includes a lever configured to receive at least a portion of the string. In some embodiments the lateral position detection element includes a biasing element disposed between the sensor and the lever such that the lever moves laterally in response to a corresponding force exerted by the string.

In some embodiments, the gesture tracking device further includes a platform disposed between the attachment structure and the sensor. Some embodiments also include a tensioner element coupled to each of the sensors to maintain tension on the string.

The present disclosure addresses at least one of the foregoing disadvantages of the prior art. However, it is contemplated that the present disclosure may prove useful in addressing other problems and deficiencies in a number of technical areas. Therefore, the claims should not necessarily be construed as limited to addressing any of the particular problems or deficiencies discussed hereinabove. To the accomplishment of the above, this disclosure may be embodied in the form illustrated in the accompanying drawings. Attention is called to the fact, however, that the drawings are illustrative only. Variations are contemplated as being part of the disclosure.

BRIEF DESCRIPTION OF THE DRAWINGS

In the drawings, like elements are depicted by like reference numerals. The drawings are briefly described as follows.

The present disclosure now will be described more fully hereinafter with reference to the accompanying drawings, which show various example embodiments. However, the present disclosure may be embodied in many different forms and should not be construed as limited to the example embodiments set forth herein. Rather, these example embodiments are provided so that the present disclosure is thorough, complete and fully conveys the scope of the present disclosure to those skilled in the art.

DETAILED DESCRIPTION OF THE PREFERRED EMBODIMENTS

As discussed above, wearable robotic control devices have emerged to provide more immersive and interactive gaming experiences. In addition, wearable robotic control devices may provide advantages in other industries, such as healthcare, manufacturing, military, and assistive devices.

Despite these advantages, however, known wearable control devices are often cumbersome and awkward to wear and use. In some cases, the bulkiness of such devices may interfere with the precision they are attempting to achieve. Such devices may also be prohibitively expensive.

As used herein, the term "phalangeal joint" refers to any interphalangeal or metacarpophalangeal joint. The term "interphalangeal joint" is used to refer to a hinge joint having a single degree of freedom and formed between adjacent phalanges of a finger. The term "metacarpophalangeal joint" is used to refer to a condyloid joint having at least two degrees of freedom and formed between a metacarpal bone and a phalange of the finger.

The term "proximal" refers to a position situated near to, or a direction extending towards, the center the body. The term "distal" refers to a position situated away from, or a direction extending away from, the center of the body. The term "dorsal" refers to the upper side or back side of a part of the body, including a hand, finger and/or thumb.

Figure 1:
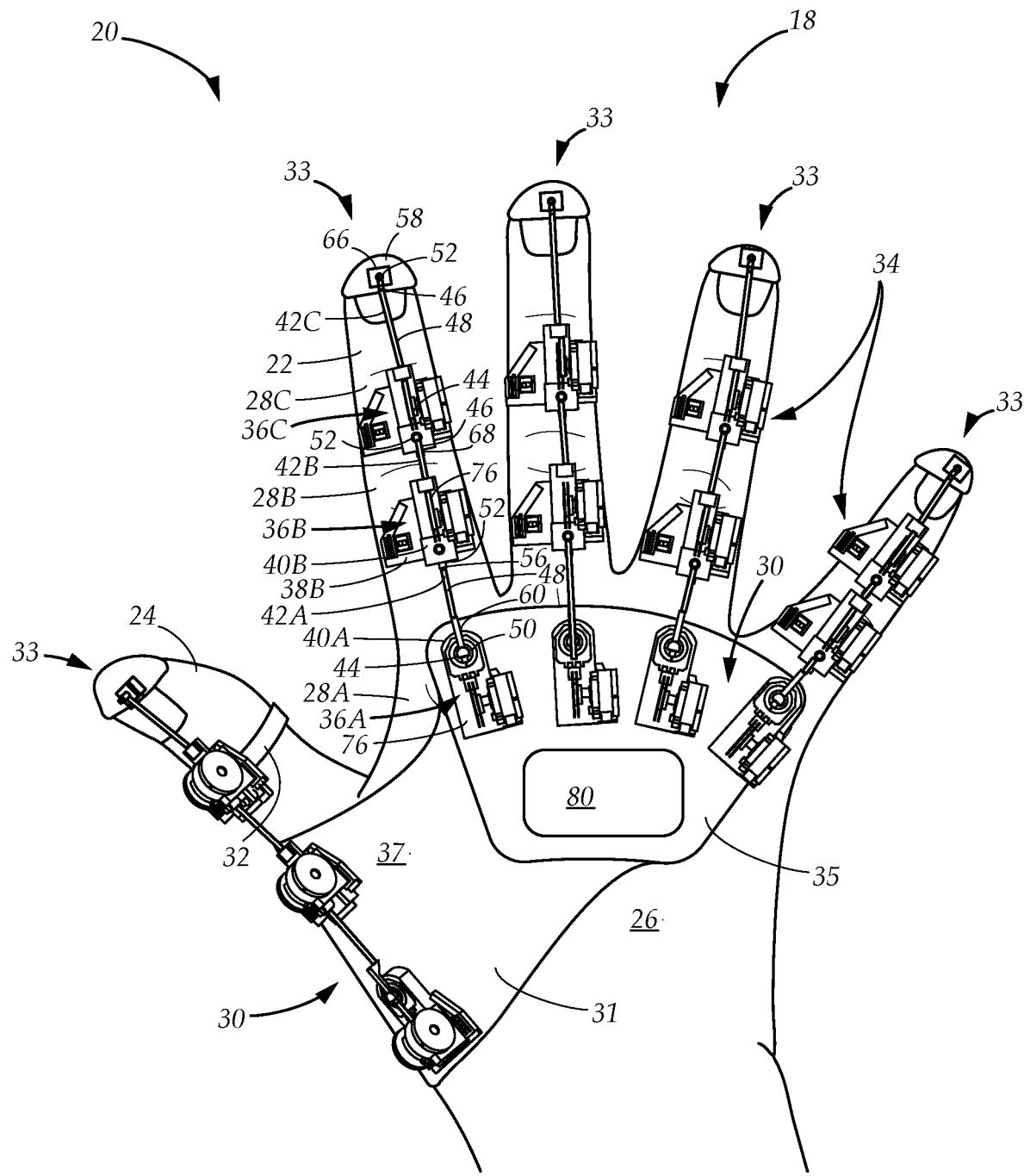
FIG. 1 is a dorsal perspective view of a representative gesture tracking system including an attachment structure and a sensor assembly implemented in connection with a human hand in accordance with the disclosure.

FIG. 1 illustrates a gesture tracking system 20 for detecting and measuring phalangeal joint movement. In one embodiment, as shown, the gesture tracking system 20 may be implemented in connection with a human hand 18 to track movements of phalangeal joints of one or more fingers 22, thumb 24, or any portion or combination thereof. In certain embodiments, the gesture tracking system 20 may include an attachment structure 30 coupled to a sensor assembly 34. The sensor assembly 34 may include one or more finger assemblies 33 corresponding to each finger 22 and/or thumb 24 of the hand 18.

In some embodiments, each finger assembly 33 of the sensor assembly 34 may include multiple sensors 36a-c configured to detect or track movement of interphalangeal joints and a metacarpophalangeal joint of a finger 22, or interphalangeal joints and a carpometacarpal joint of a thumb 24. In one embodiment, as shown, the sensor assembly 34 may include five finger assemblies 33, each corresponding to a different finger 22 or thumb 24 of the hand 18. In certain embodiments, at least a portion of the attachment structure 30 may be configured to attach to a dorsal surface 26 of the hand 18. Certain embodiments of the attachment structure 30 may include a central plate 35. As shown, four finger assemblies 33 may extend along a top edge of the central plate 35 in a radial configuration such that each finger assembly 33 may extend distally along a length of a corresponding finger 22.

Certain embodiments of the attachment structure 30 may include an extension 37 coupled to a side edge of the central plate 35. The extension 37 may be angled away from the top edge of the central plate 35 such that the extension 37 may correspond to a position of the thumb 24 of the hand 18. In some embodiments, a fifth finger assembly 33 may be coupled to the extension 37 such that it extends distally along a dorsal surface of the thumb 24 of the hand 18.

In other embodiments, the attachment structure 30 may be configured to attach to one or more fingers 22, thumb 24, hand 18, and/or portion of a hand 18. In some embodiments, the attachment structure 30 may be configured to couple to a dorsal surface 26 of the hand 18, fingers 22, and/or thumb 24. For this purpose, some embodiments of the attachment structure 30 may include a larger hand strap 31 that wraps around at least a portion of the hand 18, as well as one or more finger straps 32 that extend around each of the fingers 22 and/or thumb 24. In some embodiments, multiple finger straps 32 may be implemented such that each sensor 36a-c includes a corresponding finger strap 32.

In some embodiments, the hand strap 31 and/or finger straps 32 may include a lightweight, flexible material or fabric, which may vary depending on the portion of the hand 18 or finger 22 to which the hand strap 31 or finger strap 32 is attached. In some embodiments, a mesh or vented material may be used to increase breathability and comfort of the hand strap 31 and/or finger straps 32. In some embodiments, the hand strap 31 and/or finger straps 32 may include a natural fabric or material, a metal or metal alloy, a synthetic or polymeric material such as a plastic or vinyl, and/or a combination thereof.

In some embodiments, the hand strap 31 and/or finger straps 32 may include a rigid or substantially rigid material that may be folded, corrugated, and/or segmented to provide flexibility. In some embodiments, the hand strap 31 and/or finger straps 32 may include multiple hinged portions or portions that are otherwise pieced together to accommodate phalangeal joint or hand movements or gestures, for example. In some embodiments, one or more hand straps 31 and/or finger straps 32 may be substantially rigid to resist movement of the sensor assembly 34 relative to the portion of the hand 18, finger 22, or thumb 24 to which it is attached.

In some embodiments, each finger assembly 33 of the sensor assembly 34 may be coupled to the attachment structure 30 via stitching or one or more adhesives, mechanical fasteners or techniques, or the like. In certain embodiments, the sensor assembly 34 may include multiple finger assemblies 33, each finger assembly 33 having multiple sensors 36a-c to detect and measure movement of multiple phalangeal joints. For example, in one embodiment of a finger assembly 33, a first sensor 36a is configured to detect movement of a first phalangeal joint 28a and a second sensor 36b is configured to detect movement of a second phalangeal joint 28b. In one embodiment, the first phalangeal joint 28a is a metacarpophalangeal joint and the second phalangeal joint 28b is an interphalangeal joint. In another embodiment, the first phalangeal joint 28a is a carpometacarpal joint and the second phalangeal joint 28b is an interphalangeal joint. Some embodiments may further include a third sensor 36c configured to detect movement of a third phalangeal joint 28c. In one embodiment, the third phalangeal joint 28c is an interphalangeal joint disposed distal to the second phalangeal joint 28b.

Each sensor 36a-c of the sensor assembly 34 may detect linear movement including flexion and/or extension of a corresponding phalangeal joint. As discussed in more detail below, some embodiments of the sensor 36a-c may further detect transverse movement including abduction, adduction, and/or circumduction of the corresponding phalangeal joint. In some embodiments, the sensor assembly 34 may include multiple sensors 36a-c to detect linear and/or transverse movement of multiple phalangeal joints.

As discussed in more detail with reference to FIG. 9 while also still referring to FIG. 1, some embodiments of the sensor 36a-c may include a flexible pad 38a-c and an internal structure including a string potentiometer 40a-c and a recoil spring 50. In certain embodiments, each sensor 36a-c may be disposed proximal to a target phalangeal joint. The target phalangeal joint may include, for example, a metacarpophalangeal joint or an interphalangeal joint. In some embodiments, the flexible pad 38a-c may include a flexible material having a size and shape to accommodate its intended position along the finger 22. In some embodiments, the flexible material may be mesh and/or may be vented to facilitate breathability and comfort.

In one embodiment, the flexible pad 38a-c may include a trapezoidal, triangular, or rectangular shape having dimensions sufficient to accommodate other components of the sensor 36a-c. In these and other embodiments, opposing sides of the flexible pad 38a-c may wrap at least partially around the finger 22 to facilitate stability of the sensor 36a-c without causing interference with movement of the target phalangeal joint. The sides of the flexible pad 38a-c may include a bottom surface and an upper surface. In some embodiments, the flexible pad 38a-c may include a sleeve to partially or completely surround at least a portion of the finger 22. In some embodiments, the sleeve may include an elastic material such that the sleeve substantially conforms to the shape of the finger 22. In one embodiment, the attachment structure 30 may include a glove having one or more flexible pads 38a-c coupled to an outer surface of the fingers and/or thumb of the glove. Of course, the present disclosure contemplates an attachment structure 30 and flexible pads 38a-c having any suitable dimensions and including any suitable regular or irregular shape.

In some embodiments, one of the sides of the flexible pad 38a-c, such as the bottom surface, may be attached to a hand strap 31 or finger strap 32 of the attachment structure 30. The flexible pad 38a-c may be attached to the strap 31, 32 via stitching, an adhesive, a mechanical fastener, a combination thereof, or by any other suitable attachment mechanism or technique known to those in the art. In these and other embodiments, the finger strap 32 may have a length sufficient to accommodate a circumference of the finger 22 at a desired position. In some embodiments, the length of the finger strap 32 may be adjustable to accommodate various users and/or positions along the finger 22.

In some embodiments, as discussed in more detail with reference to FIGS. 7-9 while also still referring to FIG. 1, the string potentiometer 40a-c may be coupled to a top surface of a corresponding flexible pad 38a-c. In some embodiments, the string potentiometer 40a-c may be coupled to or integrated with a rigid or substantially rigid platform 76 disposed between the string potentiometer 40a-c and the flexible pad 38a-c. The platform 76 may include, for example, a metal, metal alloy, polycarbonate or other plastic, a composite material, and/or any other suitable material.

Embodiments of the string potentiometer 40a-c may include a flexible, high-strength string 42a-c or cable having a first end 44, a second end 46, and a length 48 therebetween. The string 42a-c may include, for example, a flexible cable or wire formed of high-strength stainless steel, aluminum, plastic, or any other suitable material known to those in the art. In some embodiments, the first end 44 of the string 42a-c may be coupled to the recoil spring 50 and the second end 46 of the string 42a-c may be attached to an anchor point 52 disposed distal to the string potentiometer 40a-c.

Figure 14:
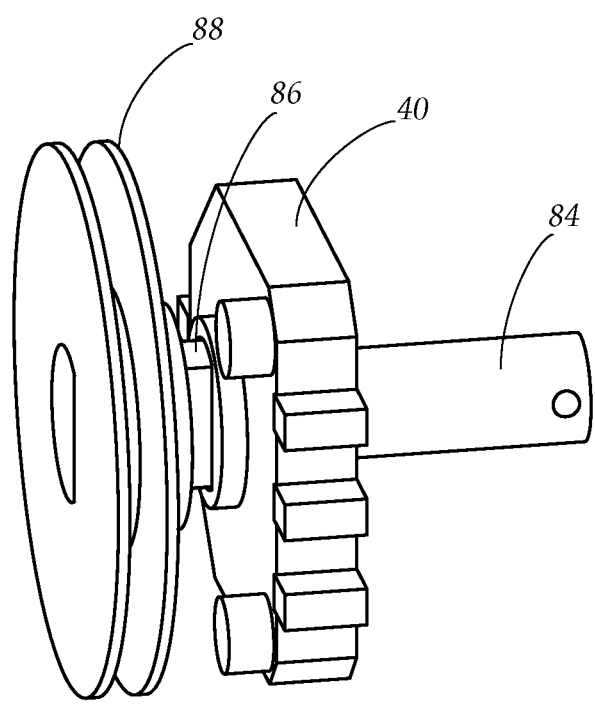
FIG. 14 is a perspective view of an example string potentiometer in accordance with the disclosure.

In certain embodiments, as depicted in more detail in FIG. 14 while also still referring to FIG. 1, the length of the string 42a-c may be disposed around a drum 88 coupled to a shaft 86 of the string potentiometer 40a-c. A release of tension on the string 42a-c may cause the string 42a-c to retract relative to the drum 88 to return to its original position and/or length. In some embodiments, the length 48 of the string 42a-c may indicate the position of the target phalangeal joint. Similarly, a change in the length 48 of the string 42a-c, or travel length, may indicate movement of the target phalangeal joint.

Some embodiments of the flexible pad 38a-c may include an anchor point 52 configured to receive the second end 46 of the string 42a-c. In some embodiments, the anchor point 52 may include an anchor element 56 such as a post 68, an aperture, a nail, a screw, a staple, a rivet, or another suitable mechanical fastener. For example, in one embodiment, the second end 46 of the string 42a-c may be disposed, wrapped around, or otherwise fastened or secured to the anchor element 56 to maintain tension on the string 42a-c between the first end 44 and the second end 46.

In certain embodiments, the finger assembly 33 may include the first sensor 36a and the second sensor 36b disposed along the finger 22 in series, where the second sensor 36b is disposed at a position distal to the first sensor 36a. In these and other embodiments, the second sensor 36b may include the anchor point 52 to which the second end 46 of the string 42a-c of the first sensor 36a may be attached. In other embodiments. the finger assembly 33 may further include a third sensor 36c positioned distally in relation to the second sensor 36b. In embodiments where the third sensor 36c is present, the third sensor 36c may include an anchor point 52 to which the second end 46 of the string 42b of the second sensor 36b may be attached.

Other embodiments may include a fingertip cap 58 disposed at a position distal to the first and/or second sensor 36a, 36b and may include the anchor point 52 to which the second end 46 of the string 42a-c of the first or second sensor 36a, 36b may be attached. A fingertip cap 58 may include, for example, a flexible material formed to fully or partially envelop or surround a fingertip such that the fingertip cap 58 may be retained by the fingertip. In some embodiments, the fingertip cap 58 may include a material identical to or similar to the material used to form the flexible pad 38a-c.

Figure 13:
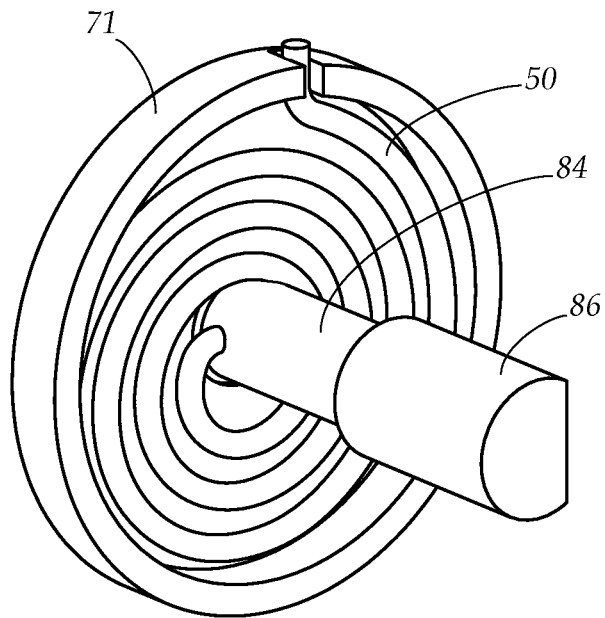
FIG. 13 is a perspective view of an example recoil spring in accordance with some embodiments.

In some embodiments, the recoil spring 50 may be coupled to or integrated with a spool 84 via any suitable mechanical fastener or technique. This internal detail is depicted in more detail in FIG. 13 while also still referring to FIG. 14 and FIG. 1. The recoil spring 50 may be a high-torque, long-life power spring and may include, for example, stainless steel, aluminum, a metal alloy, or any other suitable metal or material known to those in the art. In some embodiments, the recoil spring 50 may be a spiral spring, coil spring, compression spring, or other suitable spring. In some embodiments, the spool 84 may be coupled to or may extend from a shaft 86 of the string potentiometer 40. In certain embodiments, the shaft 86 is coupled to the drum 88 of the string potentiometer 40 such that rotation of the shaft 86 causes the length 48 of the string 42a-c to change.

In some embodiments, the second end 46 of the string 42a-c may be coupled to an anchor point 52 distal to the first end 44 of the string 42a-c. In some embodiments, the anchor point 52 may be integrated into or attached to a flexible pad 38a-c of a distally-located sensor 36a-c. In other embodiments, the anchor point 52 may be integrated into or attached to a fingertip cap 58 positioned distal to the first end 44 of the string 42a-c. In this manner, a change in the length 48 of the string 42a-c may indicate linear movement of a target phalangeal joint. For example, a reduction or shortening of the length 48 of the string 42a-c may indicate extension of the phalangeal joint, while a lengthening or extension of the length 48 of the string 42a-c may indicate flexion of the phalangeal joint. In certain embodiments, the length 48 of the string 42a-c may also indicate a linear position or angle of the target phalangeal joint.

In certain embodiments, the sensor 36a-c may further include a lateral position detection element 60 to indicate and/or measure position and/or movement of the target phalangeal joint in a transverse direction. For example, in some embodiments, the lateral position detection element 60 may be deflected or otherwise move or flex in response to movement of the string 42a-c to indicate movement of the phalangeal joint in a transverse direction. In certain embodiments, data from the lateral position detection element 60 may combine with data from the string potentiometer 40a-c to indicate circumduction of the phalangeal joint.

Figure 7:
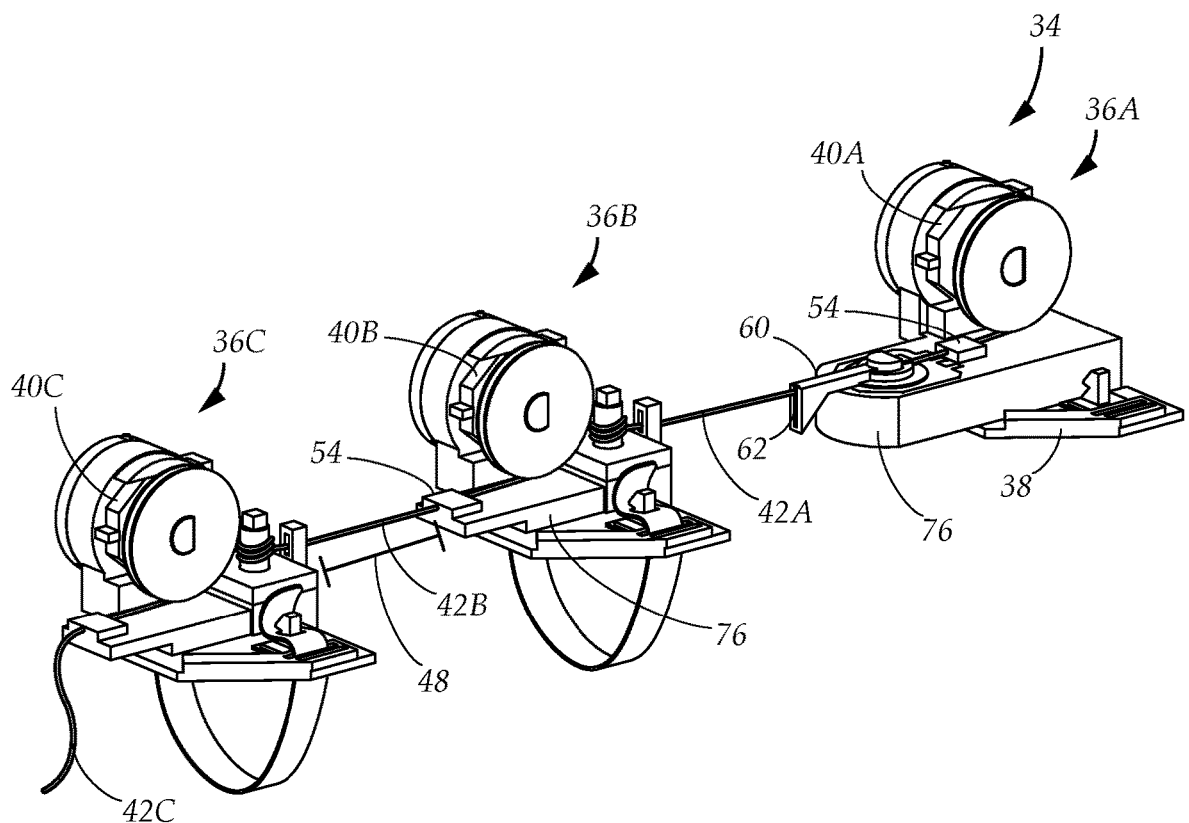
FIG. 7 is a side perspective view of a representative sensor assembly and attachment structure in accordance with the disclosure.

In some embodiments, as shown in FIG. 7 while also referring to FIG. 1, the lateral position detection element 60 may include an elongate lever formed to include a slot 62, notch, or aperture to receive a portion of the string 42a-c. In these and other embodiments, a length of the lateral position detection element 60 may extend along a portion of the length 48 of the string 42a-c. In some embodiments, the lateral position detection element 60 may include a lightweight material having sufficient rigidity to retain the string 42a-c while also permitting the lateral position detection element 60 to move or flex in response to movement of the string 42a-c in a transverse direction. In this manner, lateral joint movement such as adduction, abduction, and/or circumduction may be detected by the lateral position detection element 60.

As discussed in more detail with reference to FIGS. 16A and 16B while also still referring to FIG. 1, some embodiments of the sensor assembly 34 may be electrically coupled to a processing system such as a microcontroller 80, a signal processor, a field-programmable gate array (FPGA), or the like. Some implementations of the microcontroller 80 or other processing system may use an embedded processing system such as Raspberry Pi. A microcontroller 80 is presented by way of example and is not intended to be limiting. Indeed, the devices and systems disclosed herein may be applicable to a wide variety of different computing systems in addition to the microcontroller 80 shown. The devices and systems disclosed herein may also potentially be distributed across multiple processors and/or computing systems.

In some embodiments, the microcontroller 80 or other computer system may maintain connectivity with a remote server, such as a cloud server, by way of an appropriate wireless communication technology, such as a Wi-Fi connection, cellular data connection, or the like. In certain embodiments, the microcontroller 80 may communicate with another computing system or smart device by wireless transmission methods such as Wi-Fi or Bluetooth®.

In certain embodiments, an assistant application, or application software running on the host processing system, may provide logic or analytics that operate on data provided by the sensors 36a-c while also performing other functions. In some embodiments, the assistant application may also provide a user interface and offer connectivity to remote services provided by a cloud server, for example.

Figure 2:
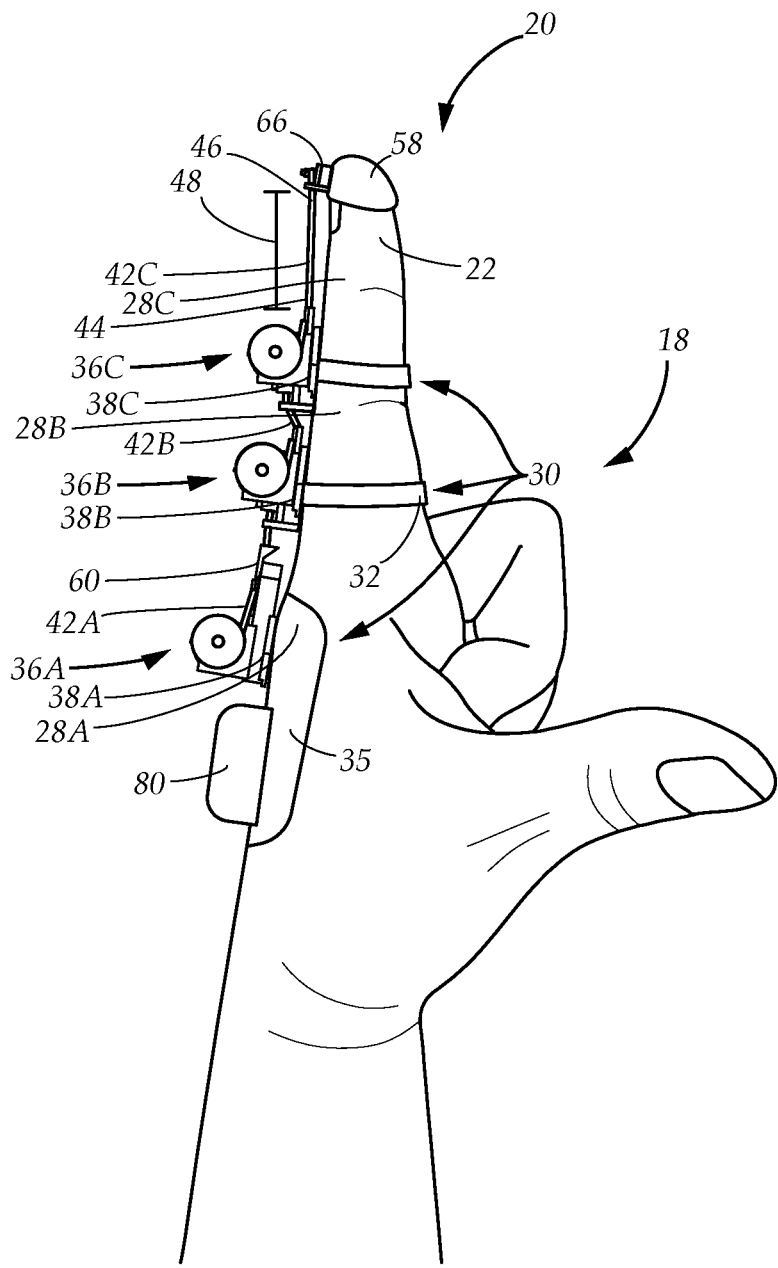
FIG. 2 is a side perspective view of another representative gesture tracking system and human hand showing extension of multiple phalangeal joints in accordance with the present disclosure.
Figure 3:
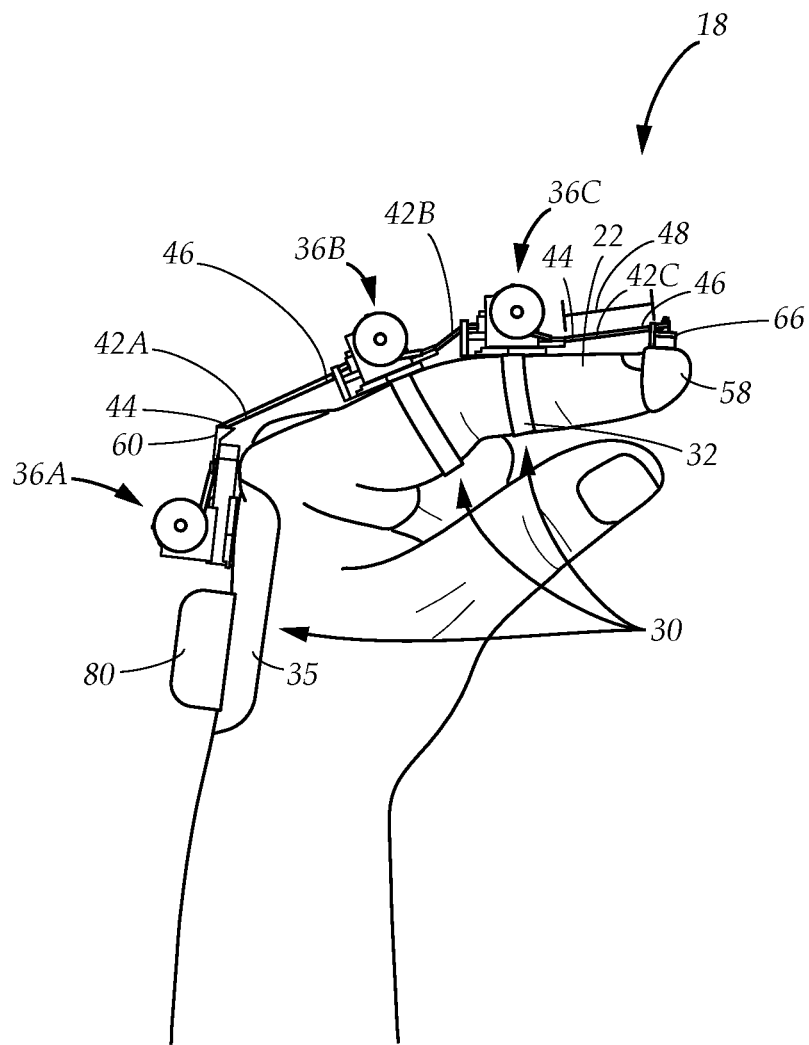
FIG. 3 is a side perspective view of the representative gesture tracking system of FIG. 2 that illustrates flexion of a phalangeal joint in accordance with some embodiments.
Figure 4:
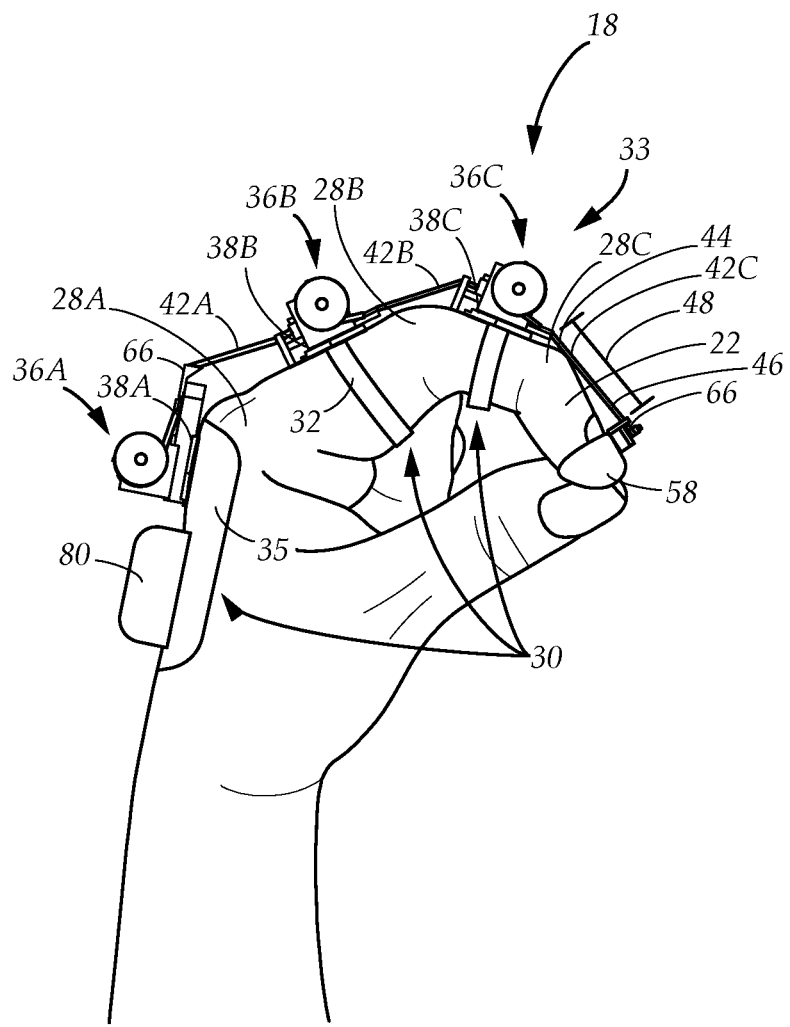
FIG. 4 is a side perspective view of the representative gesture tracking system of FIG. 2, illustrating flexion of multiple phalangeal joints in accordance with the disclosure.

Referring now to FIGS. 2, 3, and 4 while also still referring to FIG. 1, some embodiments of a sensor assembly 34 may include a finger assembly 33 having two or more sensors 36a-c disposed along a finger 22 in series. In one embodiment, the finger assembly 33 includes the first sensor 36a coupled to the finger 22 at a position proximal to a first phalangeal joint 28a, a second sensor 36b coupled to the finger 22 at a position proximal to a second phalangeal joint 28b, and a third sensor 36c coupled to the finger 22 at a position proximal to a third phalangeal joint 28c. In some embodiments, the first phalangeal joint 28a may be a metacarpophalangeal joint and the second and third phalangeal joints 28b, 28c may be interphalangeal joints.

In these and other embodiments, the first sensor 36a may include a flexible pad 38a coupled to the hand 18 via an elongate hand strap 31 or band configured to wrap around a portion of the hand 18. Alternatively, the flexible pad 38a of the first sensor 36a may be attached to the hand 18 via a hand strap 31 applied via an adhesive to at least a portion of a bottom surface thereof.

As shown, each of the second and third sensors 36b, 36c may be coupled to the finger 22 via a finger strap 32 attached to a respective flexible pad 38b, 38c and configured to circumscribe the finger 22 at a position proximal to a target phalangeal joint. In some embodiments, the length and/or fit of each finger strap 32 relative to the finger 22 may be customized or adjusted as desired. In certain embodiments, each finger strap 32 may be coupled to an inner or outer surface of a glove or sleeve to circumscribe the finger 22.

Figure 8:
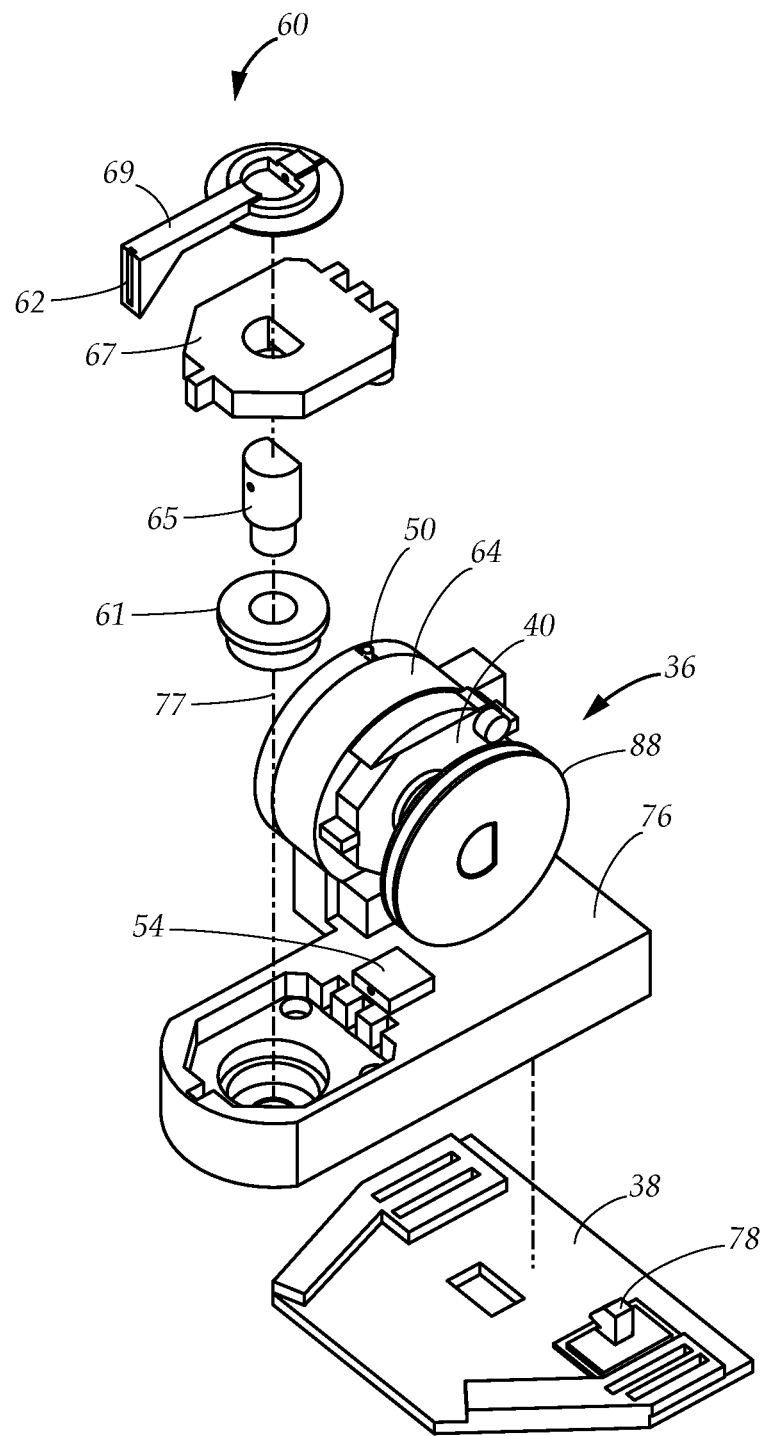
FIG. 8 is an exploded side perspective view of an example sensor illustrating a representative lateral position detection element in accordance with certain embodiments.
Figure 9:
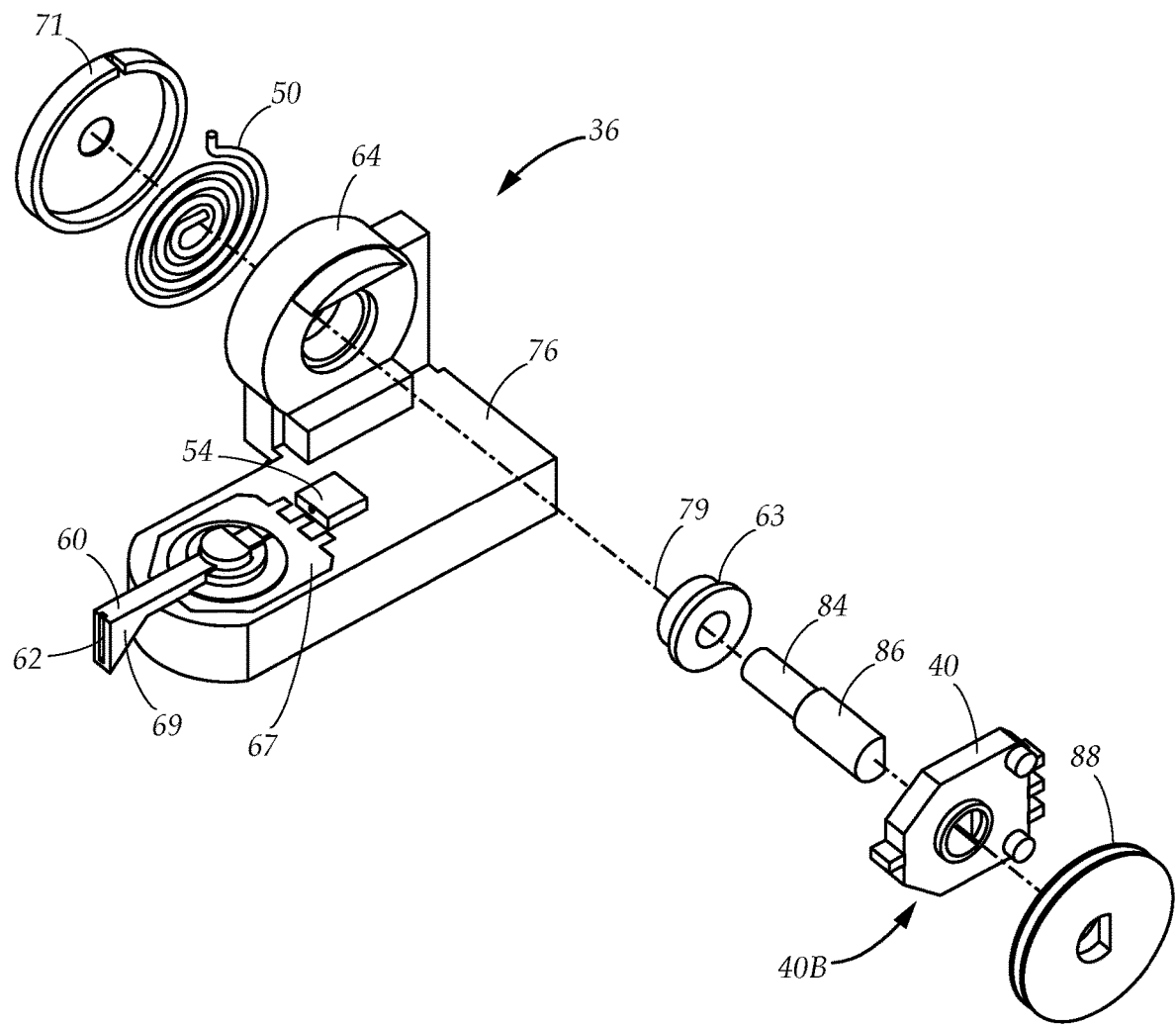
FIG. 9 is an exploded side perspective view of an example sensor illustrating a representative housing including a string potentiometer and recoil spring in accordance with the disclosure.

As shown, in some embodiments, and as depicted in more detail in FIGS. 8 and 9 while also still referring to FIG. 1, the first sensor 36a may include a flexible pad 38a, a string potentiometer 40a, a recoil spring 50, and a lateral position detection element 60. The flexible pad 38a may provide a comfortable interface between a user's hand 18 and the other sensor components. In some embodiments, the string potentiometer 40a and recoil spring 50 may be aligned along a horizontal axis 79. The flexible pad 38a may support the string potentiometer 40a and in an upright position along a vertical axis 77.

In some embodiments, a top surface of the flexible pad 38a may be coupled to or integrated with a bottom surface of the string potentiometer 40a. In other embodiments, the string potentiometer 40a and recoil spring 50 may be contained within a housing 64 and the housing 64 may be coupled to the flexible pad 38a. In some embodiments, the tensioner element 66 may also be included within the housing 64. In some embodiments, the housing 64 may be substantially rigid and may include an outlet or aperture integrated into a portion thereof. In certain embodiments, the string 42a may extend from the string potentiometer 40a in a direction transverse to the horizontal axis 79 through the outlet.

As shown, some embodiments of the lateral position detection element 60 may be coupled to the flexible pad 38a or platform 76 in a direction transverse to the horizontal axis 79. The first end 44 of the string 42a may be coupled to the drum 88 internally within the housing 64. In some embodiments, as shown, at least a portion of the length 48 of the string 42a may extend through the outlet in a direction transverse to the horizontal axis 79 and may be received by a portion of the lateral position detection element 60. In some embodiments, at least a portion of the length 48 of the string 42a may extend along a length of the lateral position detection element 60.

In these and other embodiments, the second end 46 of the string 42a may extend from a distal end of the lateral position detection element 60. In some embodiments, the second end 46 of the string 42a may be coupled to an anchor point 52 distal to the lateral position detection element 60. As shown, in one embodiment, the anchor point 52 may be integrated with or coupled to the second sensor 36b or housing 64. In other embodiments, the anchor point 52 may be integrated with or coupled to a fingertip cap 58.

Similarly, in certain embodiments, the second sensor 36b may include a string 42b that extends in a transverse direction relative to the horizontal axis 79 from the second string potentiometer 40b and/or housing 64. As shown, the second end 46 of the string 42b may be attached to an anchor point 52 integrated with or coupled to the fingertip cap 58. In embodiments where the third sensor 36c is present within the finger assembly 33, the second end 46 of the string 42b of the second sensor 36b is attached to an anchor point 52 integrated with or coupled to the third sensor 36c or the housing 64 thereof. The second end 46 of the string 42c of the third sensor 36c is attached to the anchor point 52 of the fingertip cap 58.

In some embodiments, a tensioner element 66 may be coupled to or integrated with the flexible pad 38a-c, housing 64, platform 76, or fingertip cap 58 and may be configured to receive a portion of the string 42b. As discussed in more detail with reference to FIGS. 15A and 15B while also still referring to FIG. 1, some embodiments of the tensioner element 66 may maintain tension on the string 42b between its first end 44 and its second end 46 during operation of the gesture tracking system 20. In this manner, the length 48 of the string 42b may accurately reflect a position, angle, and/or movement of an associated phalangeal joint.

As shown in FIG. 2 while also still referring to FIG. 1, for example, string length 48 is shortest when the target phalangeal joint is fully extended. Thus, when data from each sensor 36a-c disposed on a finger 22 reflects the shortest length 48 possible for each associated string 42a-c, the finger 22 is fully extended. Any variance from the shortest length 48 may indicate linear movement of the corresponding target phalangeal joint. As shown in FIG. 3 while also still referring to FIG. 1, for example, flexion of the first phalangeal joint 28a may result in an increased length 48 of the first string 42a. Similarly, as shown in FIG. 4, flexion of the second and third phalangeal joints 28b, 28c may result in increased lengths 48 of the second and third strings 42b, 42c, respectively.

Figure 5:
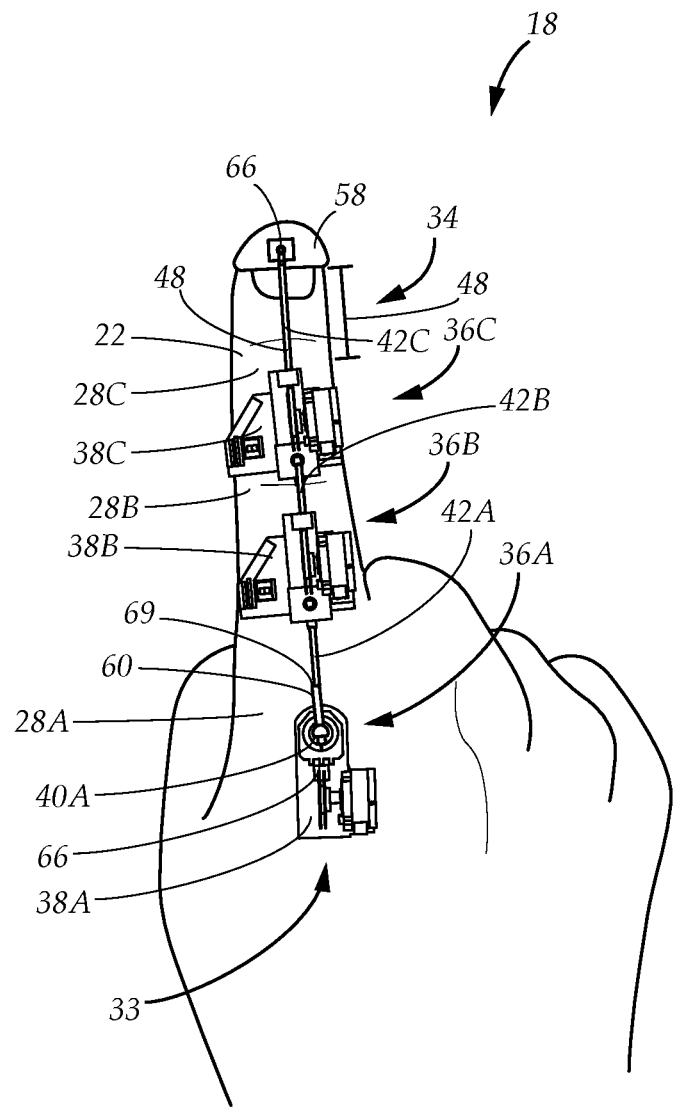
FIG. 5 is a dorsal perspective view of another representative gesture tracking system and human hand illustrating extension of the phalangeal joints in accordance with certain embodiments.
Figure 6:
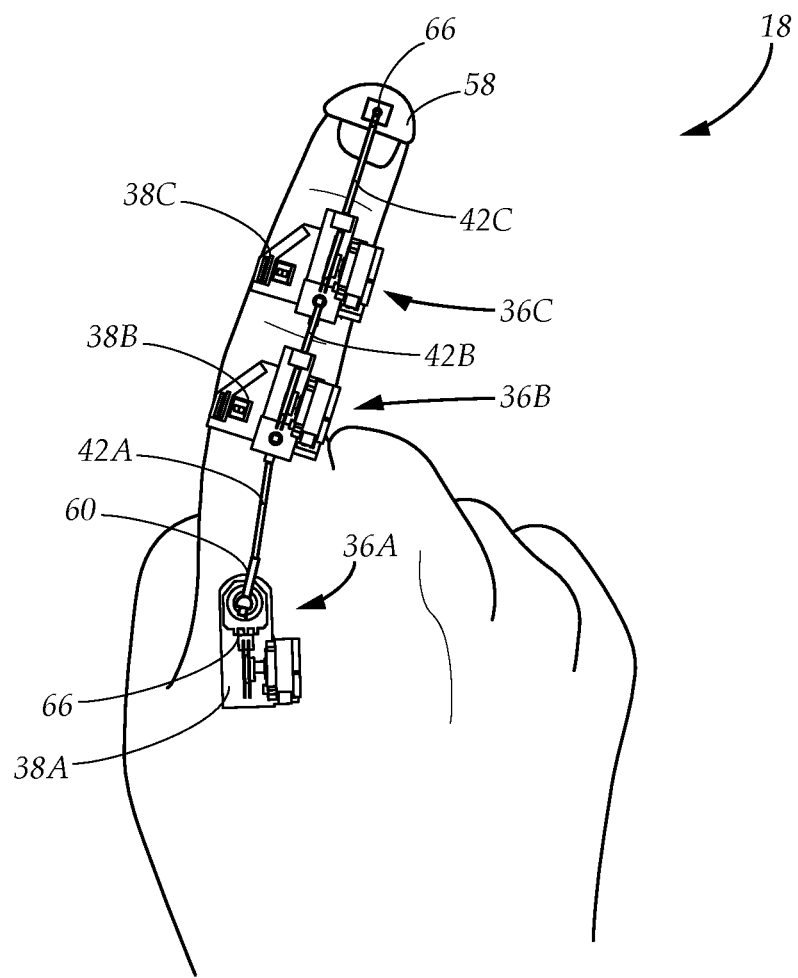
FIG. 6 is a top perspective view of the representative gesture tracking system of FIG. 5 showing adduction of a single phalangeal joint of the human hand.

Referring now to FIGS. 5 and 6, some embodiments of the sensor 36a-c may be coupled to a lateral position detection element 60. In some embodiments, the lateral position detection element 60 may include a potentiometer. Some embodiments of the lateral position detection element 60 may include a terminal end forming a slot 62 (NOT SHOWN), notch, or aperture to receive a portion of the string 42a-c. In some embodiments, a portion of the length 48 of the string 42a-c may extend along a portion of the length of the lateral position detection element 60.

In some embodiments, the lateral position detection element 60 may include an elongate lever configured to deflect or flex in at least one lateral direction in response to string 42a-c movement. In other embodiments, the lateral position detection element 60 may include a substantially rigid material. In some embodiments, a biasing element such as a hinge, fold, or other feature may be disposed between the sensor and the lever to enable the lever to move laterally in response to a corresponding force exerted by the string 42a-c. Some embodiments of the lateral position detection element 60 may include a potentiometer to detect and track lateral movement of the string 42a-c. In this manner, the lateral position detection element 60 may detect and/or measure lateral movement of an associated phalangeal joint.

As shown in FIG. 5, in some embodiments, a lever 69 of the lateral position detection element 60 may be substantially aligned with the string 42a-c when the first phalangeal joint 28a is in a relaxed or natural position. As shown in FIG. 6 and still referring to FIG. 5, lateral movement of the first phalangeal joint 28a may force the string 42a-c in a transverse direction, causing the string 42a-c to exert an associated lateral force on the lateral position detection element 60. In some embodiments, a potentiometer associated with the lateral position detection element 60 may detect and record this data. In certain embodiments, the data may be packaged and/or transmitted to the microcontroller 80 (NOT SHOWN) or another processing device. In certain embodiments, the data may be processed in combination with linear movement data detected by an associated string potentiometer 40a to detect and/or track circumduction of the phalangeal joint.

Referring now to FIG. 7 while also still referring to FIG. 1, some embodiments of the finger assembly 33 may include multiple sensors 36a-c coupled in series. As shown, in some embodiments, the attachment structure 30 may include multiple finger straps 32, where each component or finger strap 32 is attached to one of the sensors 36a-c. In certain embodiments, the finger strap 32 may be coupled to or integrated with each flexible pad 38a-c such that the finger strap 32 may extend from one side to an opposite side of the flexible pad 38a-c.

In some embodiments, the finger strap 32 may include one or more apertures having a size and shape to receive a projection 78 coupled to or integrated with the flexible pad 38a-c. In one embodiment, one side of the flexible pad 38a-c may include a mechanical fastener to fix a position of the finger strap 32 relative to the flexible pad 38a-c while an opposite side of the flexible pad 38a-c includes the projection 78. In operation, the flexible pad 38a-c may be disposed adjacent to the distal surface of the finger 22 such that the length of the finger strap 32 is disposed adjacent to a ventral surface of the finger 22. One of the apertures of the finger strap 32 may be selectively engaged with the projection 78 to secure the flexible pad 38a-c relative to the finger 22. In certain embodiments, the finger strap 32 may include multiple apertures to facilitate adjustment of the length of the finger strap 32.

In some embodiments, the flexible pad 38a-c or platform 76 may further include a guide element 54 to guide the length 48 of the string 42a-c from the string potentiometer 40a-c to the anchor point 52. The guide element 54 may include, for example, a slot or channel through which the string 42a-c may extend. Some embodiments of the guide element 54 may include an entrance, an exit, a top surface, one or more sidewalls, and/or an aperture. Dimensions of the guide element 54 may be selected to restrict lateral movement of the string 42a-c to a range of motion necessary for the lateral position detection element 60 to detect lateral movement of the target joint.

Referring now to FIG. 8 while also still referring to FIG. 1, FIG. 7 and FIG. 9, in some embodiments, a sensor 36 may be coupled to the flexible pad 38 via a platform 76. Some embodiments of the platform 76 may include a substantially rigid material such as metal, plastic, a composite material, or the like, to support the sensor 36 relative to the dorsal surface 26 of the hand 18, finger 22, or thumb 24 during operation. In one embodiment, the platform 76 may be attached to the hand strap 31 either directly or via a flexible pad 38. The hand strap 31 allows the sensor 36 to be anchored in position above the dorsal surface 26 of the hand 18 where a finger strap 32 would be unsuitable. In some embodiments, the platform 76 may incorporate an aperture, projection, recess, and/or indentation having a size and shape to receive and stabilize a portion of the housing 64 or string potentiometer 40a-c relative thereto. In other embodiments, the platform 76 may be molded around the housing 64 or string potentiometer 40a-c or may be attached to the housing 64 or string potentiometer 40a-c via one or more mechanical fastening mechanisms such as screws, nails, rivets, or the like. In certain embodiments, the guide element 54 may be positioned upon the platform 76 instead of on the flexible pad 38a-c. The guide element 54 of the first sensor 36A may be positioned on the platform 76 between the drum 88 and the lateral position detection element 60.

Similarly, in some embodiments, the lateral position detection element 60 may be integrated with or coupled to the housing 64 or the platform 76. In certain embodiments, the platform 76 may include an aperture, projection, recess, and/or indentation having a size and shape to receive and stabilize a portion of the lateral position detection element 60 relative thereto. Some embodiments of the lateral position detection element 60 may include one or more structural components such that the lateral position detection element 60 may be retained in an upright position relative to the platform 76.

In some embodiments, the lateral position detection element 60 may be coupled to the platform 76 such that it is aligned with a vertical axis 77 and disposed perpendicularly with respect to the platform 76. In some embodiments, the lateral position detection element 60 may be disposed parallel to the sensor. In one embodiment, as depicted by FIG. 8, the lateral position detection element 60 may include a bearing 61, a shaft 65, a potentiometer 67, and a lever 69 arranged coaxially along the vertical axis 77. As shown, the bearing 61 may be coupled to the platform 76 such that the shaft 65 is permitted to spin freely within the potentiometer 67 in response to lateral movement of the lever 69. In this manner, the lateral position detection element 60 may detect lateral movement of an associated phalangeal joint with a high degree of accuracy.

Referring now to FIGS. 9-16B, in certain embodiments, the string potentiometer 40, recoil spring 50, and at least a portion of the string 42 (NOT SHOWN) may be contained within the housing 64. In some embodiments, a portion of the housing 64 may include a notch to retain an end of the recoil spring 50.

As shown in FIG. 9, in some embodiments, components of the housing 64 may be arranged coaxially along a horizontal axis 79. In one embodiment, for example, the housing 64 may contain the drum 88, the string potentiometer 40, a shaft 86, a spool 84, a bearing 63, the recoil spring 50, and an end cap 71, all aligned and coupled together along the horizontal axis 79. The bearing 63 may be disposed between the shaft 86 and the string potentiometer 40 such that the shaft 86 may spin freely within the string potentiometer 40 in response to linear movement of the string 42 (NOT SHOWN). In this manner, the string potentiometer 40 may demonstrate high sensitivity and accuracy in detecting and measuring linear movement of an associated phalangeal joint.

In some embodiments, the recoil spring 50 may be coupled to the spool 84 to maintain tension. The spool 84 may be coupled to a shaft 86 of the string potentiometer 40, while the first end 44 (NOT SHOWN) of the string 42 (NOT SHOWN) may also be coupled to the shaft 86 and disposed on the drum 88. In some embodiments, as the length 48 (NOT SHOWN) of the string 42 (NOT SHOWN) extends along the target phalangeal joint, the spool 84 and shaft 86 may rotate, thereby creating an electrical signal proportional to the string 42 (NOT SHOWN) length 48 (NOT SHOWN) and/or velocity. Movement of each joint may thus be reflected in a separate electrical signal, resulting in increased precision in detecting and tracking joint movement. The electrical signal corresponding to each sensor 36 may then be packaged and/or transmitted to the microcontroller 80 (NOT SHOWN) or other processing system. In some embodiments, as depicted in FIGS. 16A and 16B while still referring to FIG. 9, the signal may be transmitted to the microcontroller 80 (NOT SHOWN) via one or more connectors 82, or other wired or wireless connection.

Referring to FIG. 9 along with FIGS. 2-4, the string potentiometer 40 is the preferred implementation of the rotational sensor 40b. However, in certain embodiments, the sensor 36 may incorporate an alternative rotational sensor 40b in lieu of a potentiometer, which is also configured to detect the linear movement of the string 42a-c by measuring the rotational movement of the shaft 86. The rotational sensor 40b may incorporate control input or sensing technologies known to those skilled in the art, and may be implemented using a hall effect sensor, a rotary encoder, rotary position sensor, or other appropriate sensing device. Such devices share common characteristics with potentiometers, and those skilled in the art will appreciate that these sensing devices may be integrated into alternate embodiments of the sensor 36 to operate in accordance with the principles described in the present disclosure. In an embodiment, the rotational sensor 40b is positioned coaxially with the horizontal axis 79 in alignment with the shaft 86, spool 84, bearing 63, and drum 88, in a manner substantially similar to the arrangement of the potentiometer 40 to allow the shaft 86 to spin or rotate within the rotational sensor 40b while also allowing the recoil spring 50 to assist in retracting the string 42a-c. The rotational sensor 40b may be contained partially or entirely within the housing 64.

In an embodiment where the rotational sensor 40b is configured as a hall sensor, the rotational sensor 40b comprises an electromagnetic sensor while the shaft 86 may be configured with one or more magnets. When the shaft 86 turns within the rotational sensor 40b, the one or more magnets follow the rotational movement of the shaft 86, and the electromagnetic sensor measures the rotational movement of the shaft 86 by detecting the presence and magnitude of the magnetic field emitted by the one or more magnets. In an embodiment where the rotational sensor 40b is configured as a rotary encoder, the rotational sensor 40b detects the rotation of the shaft 86 as the shaft turns within the rotational sensor 40b, and converts the angular position or motion of the shaft 86 into an electrical signal. For example, the rotary encoder may be an optical rotary encoder with a light-emitting element and a plurality of light-sensing elements configured in a pattern. Rotation of the shaft 86 causes light produced by the light-emitting element to move across the pattern of light sensing elements and illuminate a portion of the light sensing elements, thus allowing the rotational position of the shaft 86 to be encoded within the electrical signal produced by the rotational sensor 40b.

The electrical signal produced by the rotational sensor 40b is then transmitted to the microcontroller 80, whereupon the electrical signal is decoded or interpreted to measure the magnitude, direction, and velocity of the joint which the sensor 36 is positioned to measure. Note that in some embodiments, the gesture tracking system 18 may employ sensors 36 configured with a mix of different sensing technologies. For example, in one embodiment, the first sensor 36a may be configured with a rotary encoder to detect flexion and extension, while the lateral position detection element 60 may be configured with a potentiometer or other sensing device.

Figure 10:
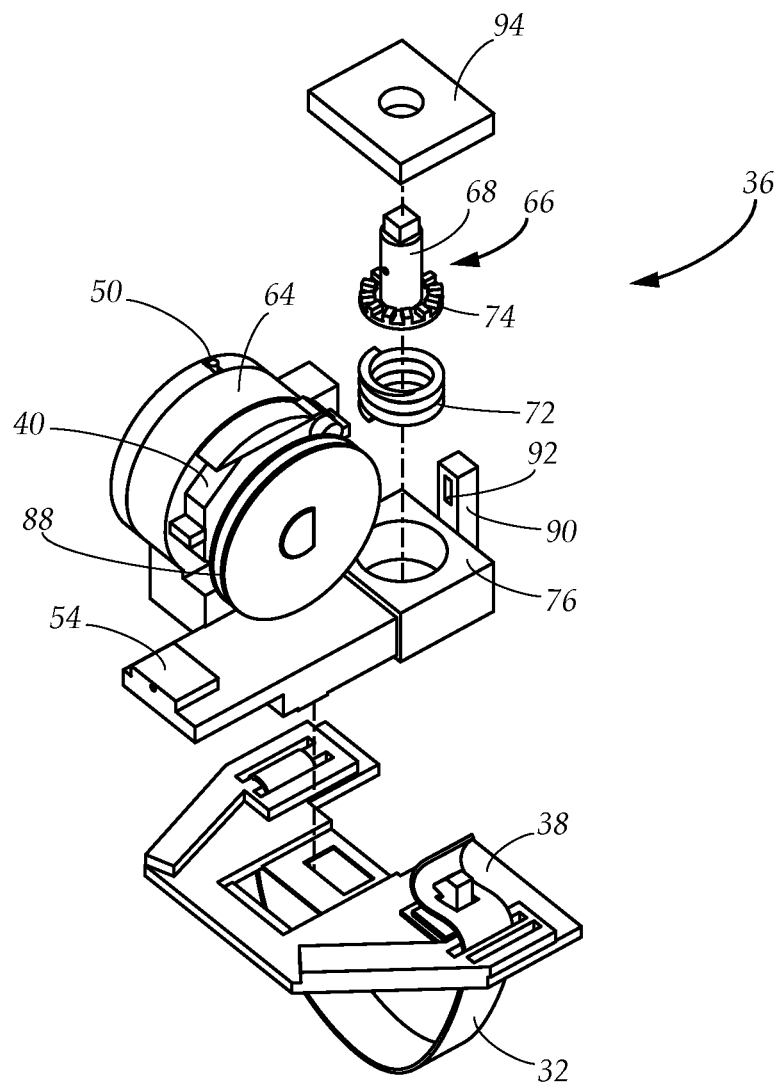
FIG. 10 is an exploded top perspective view of an example sensor illustrating a tensioner element in accordance with certain embodiments.
Figure 11:
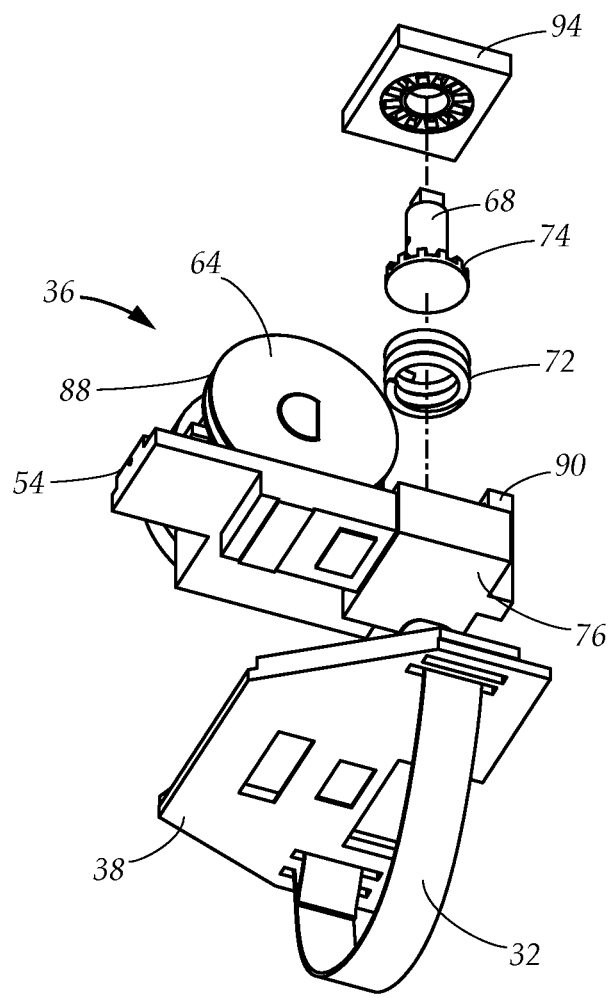
FIG. 11 is an exploded bottom perspective view of an example sensor and attachment structure illustrating a representative tensioner element in accordance with the disclosure.
Figure 12:
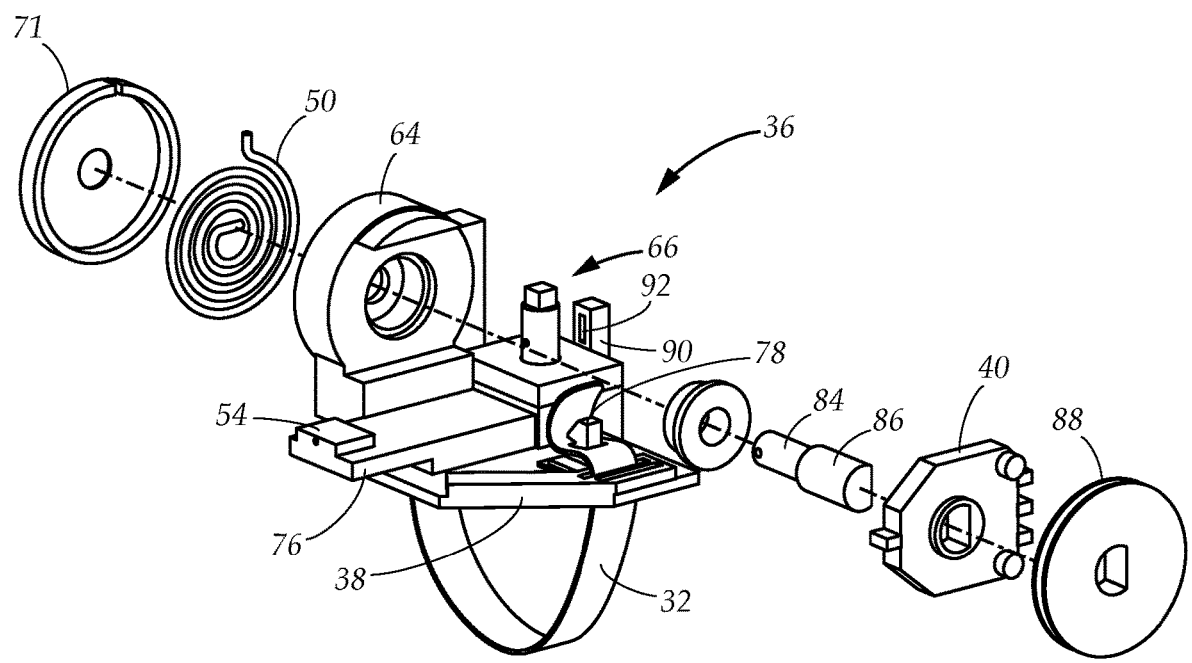
FIG. 12 is an exploded side perspective view of a representative sensor including an example housing, an example string potentiometer, and an example recoil spring in accordance with the disclosure.

Referring now to FIGS. 10, 11, and 12 while also still referring to FIG. 1, some embodiments of the sensor 34 may include a tensioner element 66 to maintain and/or adjust tension on the string 42 (NOT SHOWN). In some embodiments, the tensioner element 66 may be coupled to the flexible pad 38 or housing 64. In other embodiments, the tensioner element 66 may be coupled to the platform 76 via an aperture, projection, recess, and/or indentation incorporated into the platform 76 to receive at least a portion of the tensioner element 66. In some embodiments, the platform 76 may be molded around or coupled to the tensioner element 66 via one or more mechanical fasteners, for example.

Figure 15A:
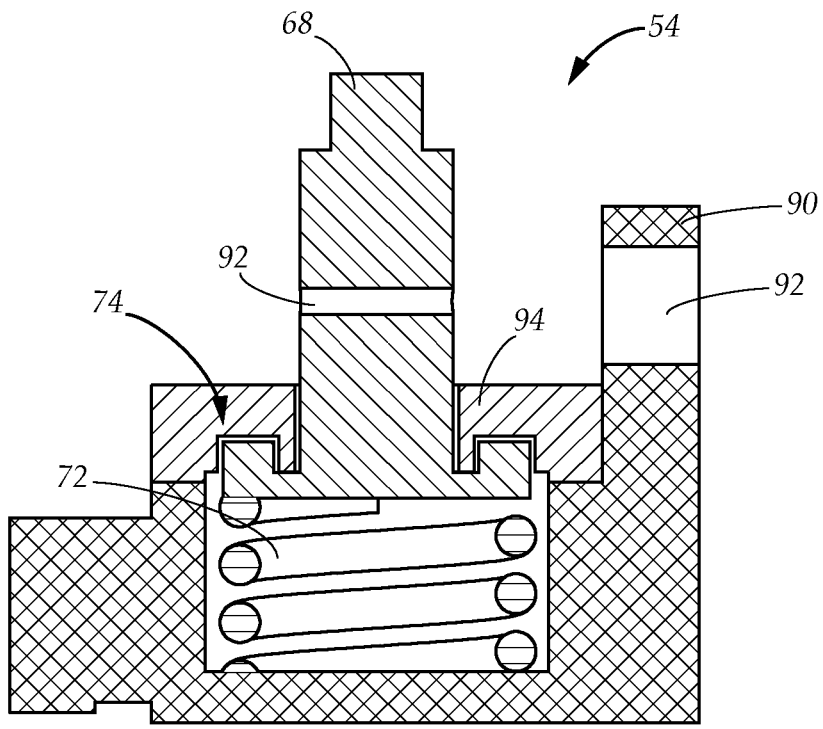
FIG. 15A is a cutaway view of a representative tensioner element in accordance with the disclosure showing the tensioner element in a locked position.
Figure 15B:
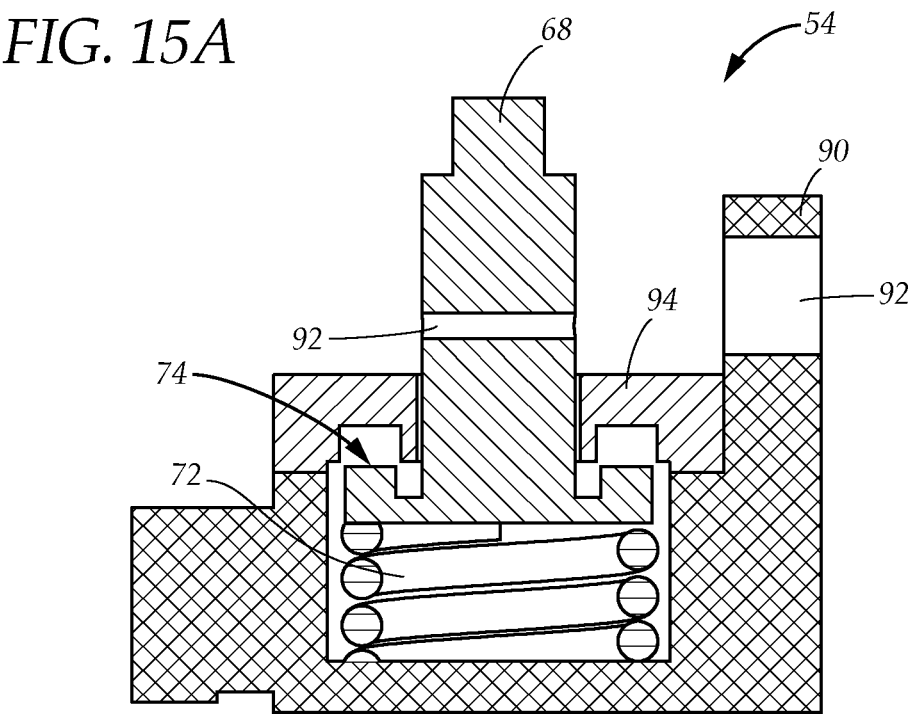
FIG. 15B is a cutaway view of the tensioner element of FIG. 15A showing the tensioner element in an unlocked position.

In one embodiment, as shown in FIGS. 10, 15A and 15B, the tensioner element 66 may include components aligned along a vertical axis. In one embodiment, the tensioner element 66 may include a column 90 and a post 68 disposed parallel to each other and aligned with the vertical axis. The column 90 may extend vertically from the flexible pad 38 or platform 76 and may include a transverse aperture to receive the string 42 (NOT SHOWN). The post 68 may be spaced apart from the column 90 and may also include a transverse aperture to receive the string 42 (NOT SHOWN). In some embodiments, the aperture of the column 90 and the aperture of the post 68 may be substantially aligned to form a transverse channel 92 such that the string 42 (NOT SHOWN) may extend through the channel 92.

In some embodiments, the post 68 may extend through a spring 72 to bias the post 68 in a vertical position relative to the flexible pad 38 and/or platform 76. In certain embodiments, a lock mechanism 74 may be coupled to the post 68 and/or to the flexible pad 38 or platform 76 to selectively fix a position of the post 68 relative to the flexible pad 38 or platform 76.

In some embodiments, the lock mechanism 74 may include at least one feature integrated into or coupled to the post 68 and an interlocking feature integrated into or coupled to the flexible pad 38 and/or platform 76. In one embodiment, the interlocking feature may be integrated into a washer 94 configured to couple to the post 68.

As shown, the lock mechanism 74 may include a gear element coupled to the post 68. The gear element may include one or more features to selectively engage one or more interlocking features of the washer 94. Of course, the lock mechanism 74 may include a single fastening element or any number of suitable fastening elements disposed in any suitable arrangement or orientation to secure the post 68 relative to the flexible pad 38 and/or platform 76.

In some embodiments, activating the lock mechanism 74 may cause the aperture of the column 90 and the aperture of the post 68 to become misaligned, thereby preventing linear movement of the string 42 (NOT SHOWN) through the channel 92. In this manner, the tensioner element 66 may selectively maintain tension on the string 42 (NOT SHOWN).

Figure 16A:
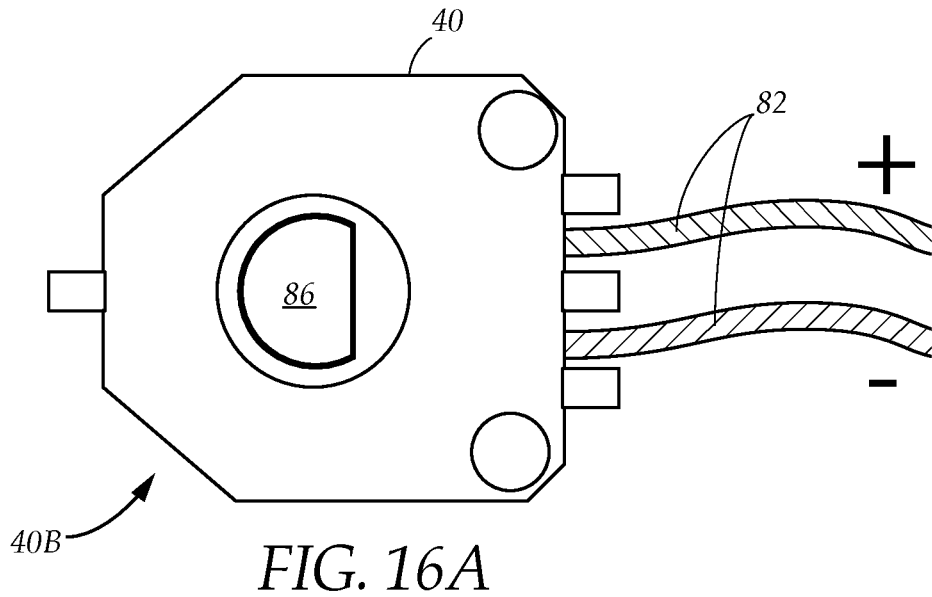
FIG. 16A is a top view of a representative housing and connectors in accordance with the disclosure.
Figure 16B:
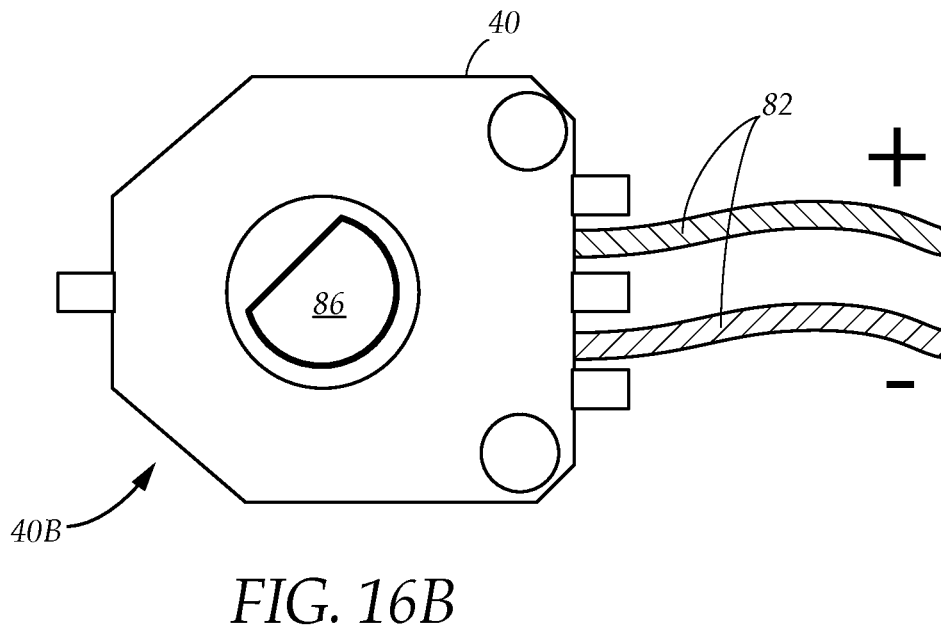
FIG. 16B is a top view of the representative housing and connectors of FIG. 16A, illustrating rotation of an example string potentiometer within the housing.

Referring now to FIGS. 16A and 16B while also still referring to FIG. 1, in some embodiments, the sensors 36a-c and/or string potentiometers 40a-c may communicate with the microcontroller 80 or other processing system via a wired or wireless connection. In certain embodiments, one or more connectors 82 may transmit an electrical signal or voltage from each of the sensors 36a-c and/or string potentiometers 40a-c. In some embodiments, the shaft 86 of the string potentiometer 40a-c may rotate to adjust the signal or voltage. The signal or voltage may be transmitted to the microcontroller 80 for storage and/or processing. In certain embodiments, the signal or voltage may be received and/or packaged by the microcontroller 80 and then transmitted to a remote server or other device or system for processing.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

In conclusion, herein is presented a gesture tracking system and device. The disclosure is illustrated by example in the drawing figures, and throughout the written description. It should be understood that numerous variations are possible, while adhering to the inventive concept. Such variations are contemplated as being a part of the present disclosure.

What is claimed is:

1. A gesture tracking system for detecting and measuring phalangeal joint movement of a finger having a plurality of phalangeal joints including a first phalangeal joint and a second phalangeal joint, the system comprising:

an attachment structure configured to couple to at least one finger; and a sensor assembly coupled to the attachment structure to detect movement of the finger, the sensor assembly comprising a plurality of sensors including a first sensor and a second sensor, wherein each sensor is associated with exactly one of the phalangeal joints, wherein each of the plurality of sensors comprises:

a string potentiometer comprising a string and a drum, the string comprising a first end, a second end, and a length therebetween, wherein the first end of the string is disposed on the drum;

a recoil spring coupled to the drum;

at least one anchor point disposed distal to the first end of the string, wherein the second end of the string is coupled to the anchor point and wherein the length of the string indicates a linear position of the associated phalangeal joint; and wherein the first sensor further comprises a lateral position detection element, wherein at least a portion of the length of the string extends through the lateral position detection element.

2. The gesture tracking system of claim 1, wherein the lateral position detection element comprises a potentiometer to detect and measure lateral movement of the associated phalangeal joint.

3. The gesture tracking system of claim 1, wherein the attachment structure comprises a flexible pad and a finger strap coupled to at least one of the plurality of sensors.

4. The gesture tracking system of claim 1, wherein the first sensor is configured to detect movement of the first phalangeal joint and the second sensor is configured to detect movement of the second phalangeal joint.

5. The gesture tracking system of claim 4, wherein each of the plurality of sensors further comprises a housing to enclose the string potentiometer and the recoil spring.

6. The gesture tracking system of claim 5, wherein the at least one anchor point of the first sensor comprises a first anchor point attached to the housing of the second sensor.

7. The gesture tracking system of claim 4, wherein the attachment structure further comprises a fingertip cap disposed distal to the second sensor, and wherein the anchor point of the second sensor is attached to the fingertip cap.

8. The gesture tracking system of claim 1, wherein the at least one anchor point is attached to the attachment structure.

9. The gesture tracking system of claim 1, wherein the at least one anchor point comprises a tensioner element coupled to the attachment structure.

10. The gesture tracking system of claim 1, wherein the anchor point of the first sensor comprises a tensioner element.

11. The gesture tracking system of claim 1, further comprising a microcontroller coupled to the sensor assembly, wherein the microcontroller is configured to receive separate electrical signals, wherein each electrical signal corresponds to each of the plurality of sensors.

12. A gesture tracking device for detecting and measuring movement of a hand, the hand having fingers and a thumb, each finger having a plurality of finger joints comprising a metacarpophalangeal joint and an interphalangeal joint, the thumb having a plurality of thumb joints comprising a carpometacarpal joint, a metacarpophalangeal joint and an interphalangeal joint, the gesture tracking device comprising:

a plurality of sensors comprising a first finger sensor, a second finger sensor, a first thumb sensor, and a second thumb sensor, each sensor comprising a housing, a string potentiometer disposed within the housing, and a recoil spring, wherein the string potentiometer comprises a string disposed on a drum, the string having a first end, a second end, and a length therebetween;

an attachment structure coupled to each of the plurality of sensors, the attachment structure comprising a plurality of flexible pads, each of the flexible pads is attached to one of the sensors and is adapted to be secured to the hand;

a finger assembly formed by the first finger sensor and the second finger sensor, wherein the first finger sensor is adapted to be disposed proximal the metacarpophalangeal joint of the finger and the second finger sensor is adapted to be disposed proximal to the interphalangeal joint of the finger;

a thumb assembly formed by the first thumb sensor and the second thumb sensor, wherein the first thumb sensor is adapted to be disposed proximal to the carpometacarpal joint and the second thumb sensor is adapted to be disposed proximal to the metacarpophalangeal joint of the thumb; and a lateral position detection element coupled to each of the first finger sensor and the first thumb sensor, the lateral position detection element comprises a lever configured to receive at least a portion of the string.

13. The gesture tracking device of claim 12, wherein each of the plurality of sensors further comprises at least one anchor point disposed distal to the first end of the string, wherein the second end of the string is coupled to the anchor point and wherein the length of the string indicates a linear position of the associated finger joint or the associated thumb joint.

14. The gesture tracking device of claim 12, wherein a change in the length of the string indicates linear movement of the associated finger joint or the associated thumb joint.

15. The gesture tracking device of claim 12, further comprising a biasing element disposed between the sensor and the lever such that the lever moves laterally in response to a corresponding force exerted by the string.

16. The gesture tracking device of claim 12, wherein the recoil spring is coupled to the drum.

17. The gesture tracking device of claim 12, further comprising a tensioner element coupled to each of the plurality of sensors to maintain tension on the string.

* * * * *